United States Patent
Sharma et al.

(10) Patent No.: US 9,787,529 B1
(45) Date of Patent: Oct. 10, 2017

(54) SYSTEMS AND METHODS FOR TUNNELING SOCKET CALLS ACROSS OPERATING SYSTEMS

(71) Applicant: Juniper Networks, Inc., Sunnyvale, CA (US)

(72) Inventors: Usha Sharma, Fremont, CA (US); Surinder Singh, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 247 days.

(21) Appl. No.: 14/599,453

(22) Filed: Jan. 16, 2015

(51) Int. Cl.
  *G06F 15/16* (2006.01)
  *H04L 12/24* (2006.01)

(52) U.S. Cl.
  CPC ................ *H04L 41/0226* (2013.01)

(58) Field of Classification Search
  CPC .................................... H04L 41/0226
  USPC .................................. 709/203–230
  See application file for complete search history.

(56) References Cited

U.S. PATENT DOCUMENTS

| | | | |
|---|---|---|---|
| 6,687,762 B1 * | 2/2004 | Van Gaasbeck | G06F 9/455 717/138 |
| 7,541,833 B1 * | 6/2009 | Neuendorffer | H03K 19/17756 326/38 |
| 7,681,207 B2 * | 3/2010 | Hunt | G06F 9/4425 718/102 |
| 8,069,253 B2 * | 11/2011 | Camarillo | H04L 29/06027 709/227 |
| 8,116,312 B2 * | 2/2012 | Riddoch | H04L 12/18 370/389 |
| 8,230,095 B2 * | 7/2012 | Tsui | G06F 9/4416 709/203 |
| 8,473,276 B2 * | 6/2013 | Qian | G06F 17/30669 704/2 |
| 8,499,029 B1 * | 7/2013 | Arimilli | G06F 9/54 709/202 |

(Continued)

FOREIGN PATENT DOCUMENTS

IL  WO 9728623 A2 *  8/1997 ........... G06F 9/4443

OTHER PUBLICATIONS

Ingalls, Robert "Sockets Tutorial", http://www.cs.rpi.edu/~moorthy/Courses/os98/Pgms/socket.html, as accessed Dec. 3, 2014, (Sep. 14, 1998).

*Primary Examiner* — Ario Etienne
*Assistant Examiner* — Thorne E Waugh
(74) *Attorney, Agent, or Firm* — FisherBroyles, LLP

(57) ABSTRACT

The disclosed method for tunneling socket calls across operating systems may include (1) intercepting a socket call issued by an application running on a first operating system, (2) determining that the socket call is directed to a network interface that is (A) accessible to a second operating system installed on a virtual machine running on the first operating system and (B) inaccessible to the first operating system and then, in response to determining that the socket call is directed to the network interface, (3) tunneling the socket call to the second operating system installed on the virtual machine, and (4) executing the socket call within the second operating system to initiate at least one networking action with respect to the network interface on behalf of the application. Various other methods, systems, and computer-readable media are also disclosed.

18 Claims, 6 Drawing Sheets

(56) References Cited

U.S. PATENT DOCUMENTS

| | | | | |
|---|---|---|---|---|
| 8,819,242 B2* | 8/2014 | Bakke | ................ | H04L 67/2895 |
| | | | | 370/466 |
| 8,924,501 B2* | 12/2014 | Tsirkin | ................... | G06F 9/544 |
| | | | | 709/213 |
| 8,938,743 B2* | 1/2015 | Murtagh | ............... | G06F 9/4443 |
| | | | | 719/329 |
| 2006/0058658 A1* | 3/2006 | King | ........................ | A61B 8/56 |
| | | | | 600/437 |
| 2008/0115150 A1* | 5/2008 | Jagana | ................ | G06F 9/45537 |
| | | | | 719/319 |
| 2012/0270538 A1* | 10/2012 | Meylan | ................ | H04W 4/003 |
| | | | | 455/426.1 |
| 2014/0258720 A1* | 9/2014 | Black | ..................... | G06F 21/52 |
| | | | | 713/165 |
| 2016/0112544 A1* | 4/2016 | Girard | .................... | H04L 69/16 |
| | | | | 709/230 |

* cited by examiner

SYSTEMS AND METHODS FOR TUNNELING SOCKET CALLS ACROSS OPERATING SYSTEMS

BACKGROUND

Socket calls are often used to establish a connection between computing devices. For example, an application running on a client device may issue a socket call to create a socket that represents one side of a communication channel between the client device and a server. Additionally or alternatively, an application running on the server may issue a socket call to create a socket that represents the other side of the communication channel between the client device and the server.

Unfortunately, some system configurations may prevent certain applications from being able to achieve an intended networking action (e.g., creating, connecting, and/or binding a socket) by way of a socket call. For example, a client device may have a system configuration that includes a host operating system and a guest operating system installed on a virtual machine. In this example, the host operating system may execute an application that was initially created for and/or ported from the guest operating system.

Even though the application has been ported to the host operating system, the application may still have certain networking dependencies that are specific to the guest operating system. For example, the application may still be configured to rely on a network stack located on the guest operating system to achieve the intended networking action of certain socket calls. Additionally or alternatively, the configuration of socket calls issued in the host operating system may differ in one way or another from the configuration of socket calls issued in the guest operating system. As a result, socket calls issued by the application running on the host operating system may fail to achieve the intended networking action upon execution.

The instant disclosure, therefore, identifies and addresses a need for systems and methods for tunneling socket calls across operating systems to achieve the intended networking actions of the socket calls.

SUMMARY

As will be described in greater detail below, the instant disclosure generally relates to systems and methods for tunneling socket calls across operating systems. In one example, a computer-implemented method for accomplishing such a task may include (1) intercepting a socket call issued by an application running on a first operating system, (2) determining that the socket call is directed to a network interface that is (A) accessible to a second operating system and (B) inaccessible to the first operating system and then, in response to determining that the socket call is directed to the network interface, (3) tunneling the socket call to the second operating system, and (4) executing the socket call within the second operating system to initiate at least one networking action with respect to the network interface on behalf of the application.

Similarly, a system for implementing the above-described method may include (1) an interception module, stored in memory, that intercepts a socket call issued by an application running on a first operating system, (2) a determination module, stored in memory, that determines that the socket call is directed to a network interface that is (A) accessible to a second operating system and (B) inaccessible to the first operating system, (3) a tunneling module, stored in memory, that tunneling the socket call to the second operating system in response to the determination that the socket call is directed to the network interface, (4) a communication module, stored in memory, that executes, within the second operating system, the socket call to initiate at least one networking action with respect to the network interface on behalf of the application, and (5) at least one physical processor that executes the interception module, the determination module, the tunneling module, and the networking module.

In one example, the above-described method may be encoded as computer-readable instructions on a non-transitory computer-readable medium. For example, a computer-readable medium may include one or more computer-executable instructions that, when executed by at least one processor of a computing device, may cause the computing device to (1) intercept a socket call issued by an application running on a first operating system, (2) determine that the socket call is directed to a network interface that is (A) accessible to a second operating system and (B) inaccessible to the first operating system and then, in response to determining that the socket call is directed to the network interface, (3) tunnel the socket call to the second operating system, and (4) execute, within the second operating system, the socket call to initiate at least one networking action with respect to the network interface on behalf of the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
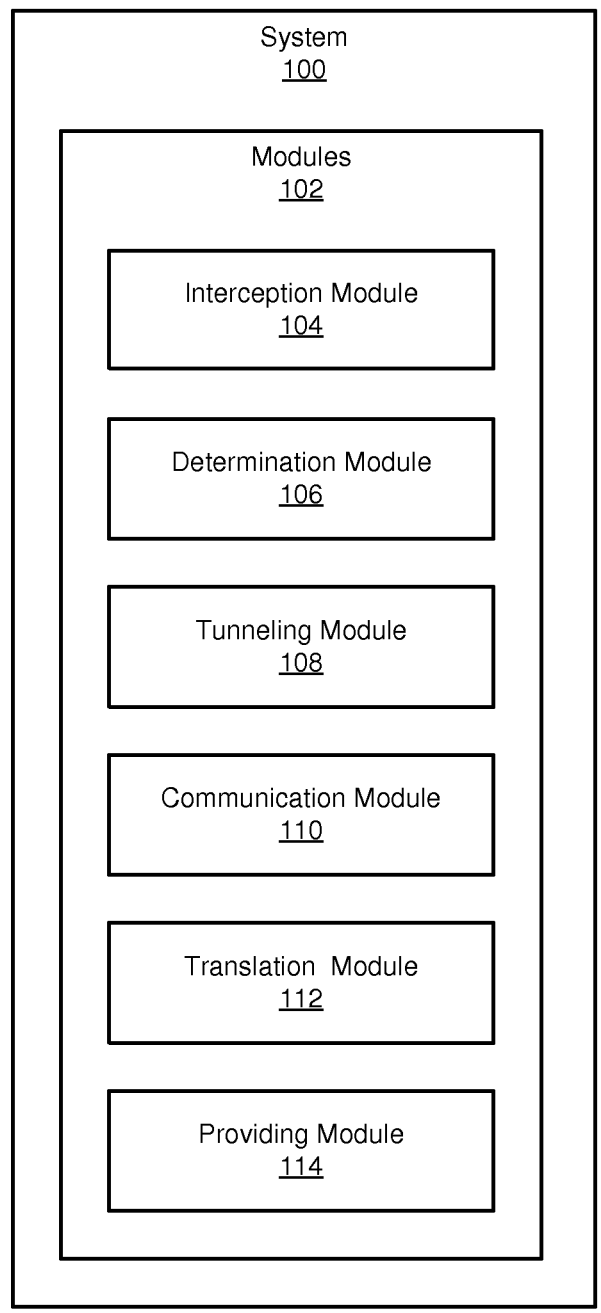
FIG. 1 is a block diagram of an exemplary system for tunneling socket calls across operating systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for tunneling socket calls across operating systems. The phrase "tunneling socket calls across operating systems," as used herein, generally refers to any type or form of process and/or mechanism that makes socket calls whose configuration are specific to at least one type of operating system compatible with and/or executable by another type of operating system.

As will be explained in greater detail below, upon determining that an intercepted socket call is directed to a network interface accessible to a guest operating system, the various systems and methods described herein may tunnel the socket call to the guest operating system such that the guest operating system is able to initiate a networking action by executing the socket call. The various systems and methods described herein may also translate at least a portion of the socket call from a configuration specific to a host operating system into a configuration specific to the guest operating system and then forward the translated portion of the socket call to the guest operating system.

The following will provide, with reference to FIGS. 1, 2, 4 and 5, detailed descriptions of exemplary systems for tunneling socket calls across operating systems. Detailed descriptions of corresponding computer-implemented methods will also be provided in connection with FIG. 3. Finally, the discussion corresponding to FIG. 6 will provide numerous examples of computing systems that may include the components shown in FIG. 1.

FIG. 1 is a block diagram of an exemplary system 100 for tunneling socket calls across operating systems. As illustrated in this figure, exemplary system 100 may include one or more modules 102 for performing one or more tasks. For example, and as will be explained in greater detail below, exemplary system 100 may include an interception module 104 that intercepts a socket call issued by an application running on a first operating system. Exemplary system 100 may also include a determination module 106 that determines that the socket call is directed to a network interface that is (1) accessible to a second operating system and (2) inaccessible to the first operating system.

In addition, and as will be described in greater detail below, exemplary system 100 may include a tunneling module 108 that tunnels the socket call to the second operating system. Moreover, exemplary system 100 may include a communication module 110 that executes the socket call within the second operating system to initiate at least one networking action with respect to the network interface on behalf of the application. Exemplary system 100 may further include a translation module 112 that translates at least a portion of the socket call from a configuration specific to the first operating system into a configuration specific to the second operating system.

Exemplary system 100 may also include a providing module 114 that provides a set of POSIX APIs to the application by way of a socket tunnel kernel module that facilitates tunneling the socket call to the second operating system. Although illustrated as separate elements, one or more of modules 102 in FIG. 1 may represent portions of a single module or application (such as a socket tunnel kernel module and/or a proxy agent).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 1 (e.g., computing device 202 and/or server 206) and/or computing system 600 in FIG. 6. One or more of modules 102 in FIG. 1 may also represent all or portions of one or more special-purpose computers configured to perform one or more tasks.

Figure 2:
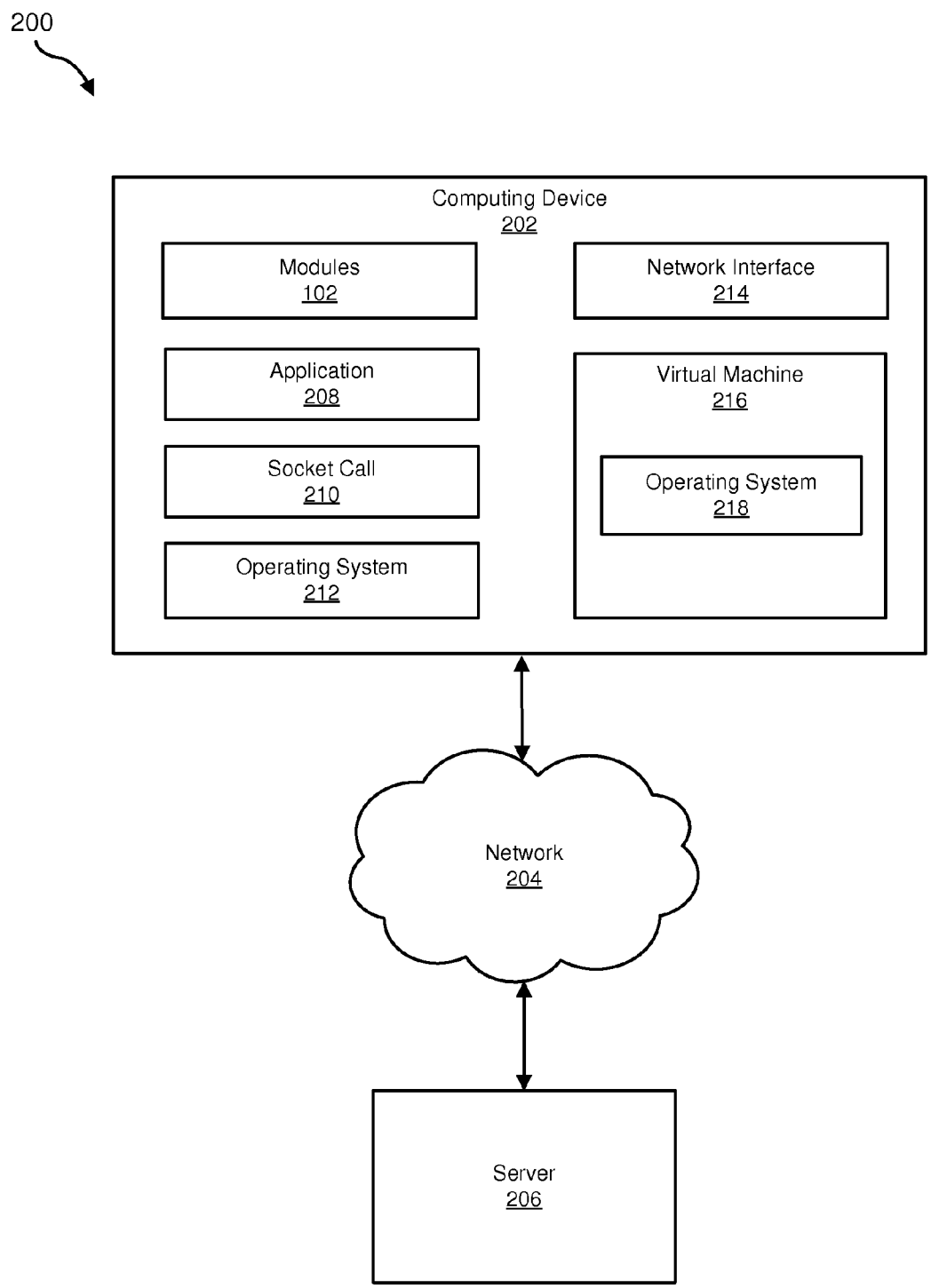
FIG. 2 is a block diagram of an additional exemplary system for tunneling socket calls across operating systems.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. In this example, computing device 202 may include a socket call 210 issued by an application 208 that runs on an operating system 212. Additionally or alternatively, computing device 202 may include an operating system 218 installed on a virtual machine 216 running on operating system 212. Computing device 202 may include a network interface 214 that is accessible to operating system 218 but inaccessible to operating system 212.

In some examples, although illustrated as a single entity in FIG. 2, computing device 202 may represent a plurality of computing devices (as described below in connection with FIG. 5). For example, computing device 202 may represent one computing device that executes a base operating system (comparable to operating system 212) and application 208. In this example, another computing device that is physically distinct from the computing device that executes the base operating system and application 208 may execute a remote operating system (comparable to operating system 218). Moreover, this physically distinct computing device may include a network interface (comparable to network interface 214) that facilitates communication with server 206.

In some examples, although illustrated as being installed on a virtual machine in FIG. 2, operating system 218 may be installed as stand-alone software outside of any virtual machine. In other words, operating system 218 may run on computing device 202 without the need to be installed on and/or executed by virtual machine 216. Additionally or alternatively, operating system 218 may run on another computing device (not illustrated in FIG. 2) without the need to be installed on and/or executed by a virtual machine. Accordingly, operating system 218 may be installed on and/or run inside or outside of a virtual machine.

In one embodiment, one or more of modules 102 from FIG. 1 may, when executed by at least one processor of computing device 202, enable computing device 202 to tunnel socket calls across operating systems. For example, and as will be described in greater detail below, one or more of modules 102 may cause computing device 202 to (1) intercept socket call 210 issued by application 208 running on operating system 212, (2) determine that socket call 210 is directed to network interface 214 that is (A) accessible to operating system 218 installed on virtual machine 216 running on operating system 212 and (B) inaccessible to operating system 212 and then, in response to determining that socket call 210 is directed to network interface 214, (3) tunnel socket call 210 to operating system 218 installed on virtual machine 216, and (4) execute, within operating system 218, socket call 210 to initiate at least one networking action with respect to network interface 214 on behalf of application 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device.

Server 206 generally represents any type or form of computing device capable of communicating with another computing device by way of a communication channel. Examples of server 206 include, without limitation, security servers, application servers, web servers, storage servers, and/or database servers configured to run certain software applications and/or provide various security, web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. Network 204 may facilitate communication or data transfer using wireless or wired connections. In one embodiment, network 204 may facilitate communication between computing device 202 and server 206.

Application 208 generally represents any type or form of software and/or application capable of running on a computing device. In one example, application 208 may have initially been created for operating system 218 and then ported from operating system 218 to operating system 212. As a result, application 208 may still have certain dependencies that are specific to operating system 218. Additionally or alternatively, application 208 may be unable to perform certain functions within operating system 212 and/or may still rely on operating system 218 to carry out those functions.

Socket call 210 generally represents any type or form of system call that implicates a socket in one way or another. The term "socket," as used herein, generally refers to any type or form of endpoint of a communication channel between multiple computing devices. Examples of socket call 210 include, without limitation, a socket system call (e.g., socket( ), a connect system call (e.g., connect( ), a read system call (e.g., read( ), a write system call (e.g., write( ), a bind system call (e.g., bind( ), a listen system call (e.g., listen( ), an accept system call (e.g., accept( ), variations of one or more of the same, combinations of one or more of the same, and/or any other suitable socket call.

Operating system 212 generally represents any type or form of operating system that manages computer hardware and software resources and/or provides common services to computer programs and/or applications. In one example, operating system 212 may represent a primary operating system, host operating system, and/or base operating system installed on computing device 202. In this example, operating system 212 may launch and/or execute virtual machine 216 that includes operating system 218. Examples of operating system 212 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

Operating system 218 generally represents any type or form of operating system that manages computer hardware and software resources and/or provides common services to computer programs and/or applications. In one example, operating system 218 may represent a secondary operating system, guest operating system, and/or remote operating system installed on computing device 202. In this example, computing device 202 may launch and/or execute operating system 212 and operating system 218 in a substantially simultaneous manner. Examples of operating system 218 include, without limitation, JUNOS, LINUX, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

Virtual machine 216 generally represents any type or form of software-based emulation of computer hardware and/or software. In one example, virtual machine 216 may include and/or represent a virtual environment and/or user space daemon that is abstracted from computer hardware by a virtual machine manager (e.g., a hypervisor). Additionally or alternatively, virtual machine 216 may provide a computing platform that launches and/or executes operating system 218.

Network interface 214 generally represents any type or form of physical or virtual interface of one computing device that facilitates communication with another computing device. In one example, network interface 214 may include and/or represent a socket. Examples of network interface 214 include, without limitation, physical interface devices, physical Ethernet ports, virtual interfaces, logical interfaces, Virtual Local Area Networks (VLANs), portions of one or more of the same, variations of one or more of the same, combinations of one or more of the same, and/or any other suitable network interface.

Figure 3:
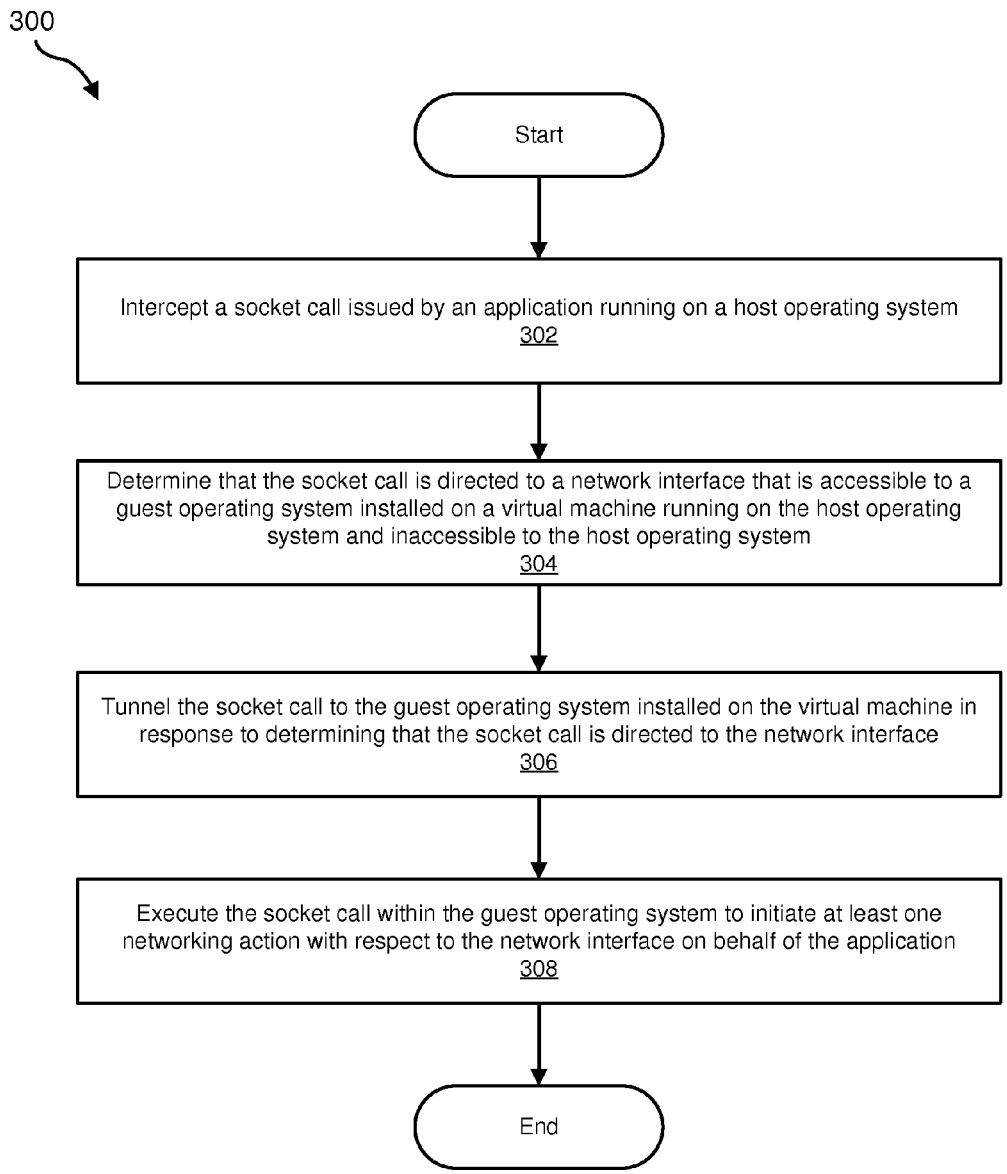
FIG. 3 is a flow diagram of an exemplary method for tunneling socket calls across operating systems.

FIG. 3 is a flow diagram of an exemplary computer-implemented method 300 for tunneling socket calls across operating systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 500 in FIG. 5.

As illustrated in FIG. 3, at step 302 one or more of the systems described herein may intercept a socket call issued by an application running on a first operating system. For example, interception module 104 may, as part of computing device 202, intercept socket call 210 issued by application 208 running on operating system 212. In this example, application 208 may have initially been created for operating system 218 and then ported from operating system 218 to operating system 212. As a result, application 208 may still have certain dependencies that are specific to operating system 218.

The systems described herein may perform step 302 in a variety of ways and/or contexts. In one example, interception module 104 may intercept socket call 210 by monitoring application 208. For example, interception module 104 may monitor application 208 to detect when application 208 issues any system calls. While monitoring application 208 in this way, interception module 104 may detect the issuance of socket call 210 by application 208. Interception module 104 may then intercept and/or trap socket call 210.

In one example, interception module 104 may be directed to screen all system calls issued by applications that have been ported from operating system 218 to operating system 212. Since, in this example, application 208 has been ported from operating system 218 to operating system 212, interception module 104 may be directed to screen all system calls issued by application 208. Accordingly, interception module 104 may intercept and/or trap socket call 210 upon issuance by application 208.

As a specific example, operating system 212 may include and/or represent a LINUX operating system running on computing device 202. In this example, operating system 218 may include and/or represent a JUNOS operating system installed on virtual machine 216 running on the LINUX operating system. Application 208 may include and/or represent a JUNOS-based application that has been ported from the JUNOS operating system to the LINUX operating system. Accordingly, application 208 may be able to run on the LINUX operating system even though application 208 was initially created and/or intended for the JUNOS operating system.

Continuing with this example, interception module 104 may be directed to monitor all system calls issued by application 208 since application 208 was ported from the JUNOS operating system to the LINUX operating system. While monitoring the system calls issued by application 208 in this way, interception module 104 may detect the issuance of socket call 210 by application 208. Interception module 104 may then intercept and/or trap socket call 210.

Returning to FIG. 3, at step 304 one or more of the systems described herein may determine that the socket call is directed to a network interface that is accessible to a second operating system installed on a virtual machine running on the second operating system and inaccessible to the first operating system. For example, determination module 106 may, as part of computing device 202, determine that socket call 210 is directed to network interface 214. In this example, network interface 214 may be directly accessible to operating system 218 but not directly accessible to operating system 212.

The systems described herein may perform step 304 in a variety of ways and/or contexts. In some examples, determination module 106 may determine that socket call 210 is directed to a network interface that is accessible to operating system 218 but inaccessible to operating system 212 based at least in part on the invocation of a proprietary library of operating system 218. For example, determination module 106 may determine that the contents of socket call 210 indicate that socket call 210 invokes a function included in a library that corresponds to operating system 218. In this example, operating system 212 may have direct access to the library, but the library may correspond to operating system 218 since the indicated function is intended for execution in operating system 218. As a result, determination module 106 may determine that, since socket call 210 invokes this function included in the library, socket call 210 is directed to a network interface that is accessible to operating system 218 but inaccessible to operating system 212.

As a specific example, determination module 106 may determine that socket call 210 invokes proprietary library "libjnprsock" located in operating system 212. In this example, operating system 212 may have direct access to the "libjnprsock" proprietary library, but the "libjnprsock" proprietary library may correspond to operating system 218 since the functions included in the "libjnprsock" proprietary library are intended for execution in operating system 218. As a result, determination module 106 may determine that, since socket call 210 invokes the "libjnprsock" proprietary library, socket call 210 is directed to a network interface that is accessible to operating system 218 but inaccessible to operating system 212.

Additionally or alternatively, determination module 106 may determine that socket call 210 is directed to a network interface that is accessible to operating system 218 but inaccessible to operating system 212 based at least in part on the API used by application 208 to issue socket call 210. For example, providing module 114 may provide a set of POSIX APIs to application 208 by way of a socket tunnel kernel module. In this example, the set of POSIX APIs may enable application 208 to issue socket calls directed to network interfaces accessible to operating system 218. Determination module 106 may determine that application 208 used the set of POSIX APIs to issue socket call 210. As a result, determination module 106 may determine that socket call 210 is directed to a network interface that is accessible to operating system 218 but inaccessible to operating system 212.

Additionally or alternatively, determination module 106 may determine that socket call 210 is directed to a network interface that is accessible to operating system 218 but inaccessible to operating system 212 based at least in part on the socket type identified in socket call 210. For example, determination module 106 may determine that the contents of socket call 210 identify a socket type that is specific to operating system 218. Since, in this example, the socket type is specific to operating system 218, determination module 106 may infer and/or deduce that socket call 210 is directed to a network interface that is accessible to operating system 218 but inaccessible to operating system 212.

As a specific example, determination module 106 may determine that socket call 210 includes a parameter that identifies "SOCK_STREAM," "SOCK_DGRAM," and/or "SOCK_RAW" as the socket type. In this example, the "SOCK_STREAM," "SOCK_DGRAM," and "SOCK_RAW" socket types may be specific to operating system 218. Since the socket type of socket call 210 is specific to operating system 218, determination module 106 may determine that socket call 210 is directed to a network interface that is accessible to operating system 218 but inaccessible to operating system 212.

Additionally or alternatively, determination module 106 may determine that socket call 210 is directed to a network interface that is accessible to operating system 218 but inaccessible to operating system 212 based at least in part on the protocol implemented by socket call 210. For example, determination module 106 may determine that socket call 210 implements a proprietary protocol that is specific to a tunnel leading to operating system 218. Since, in this example, the proprietary protocol is specific to the tunnel leading to operating system 218, determination module 106 may infer and/or deduce that socket call 210 is directed to a network interface that is accessible to operating system 218 but inaccessible to operating system 212.

In one example, determination module 106 may determine that socket call 210 represents a request to transmit at least one packet to an external computing device (such as server 206) via network interface 214 accessible to operating system 218. In this example, operating system 218 may include a remote network stack that is independent of a native network stack internal to operating system 212. This remote network stack may include a routing table that identifies a route to the external computing device by way of network interface 214.

Returning to FIG. 3, at step 306 one or more of the systems described herein may tunnel the socket call to the second operating system installed on the virtual machine in response to determining that the socket call is directed to the network interface. For example, tunneling module 108 may, as part of computing device 202, tunnel socket call 210 to operating system 218 installed on virtual machine 216 in response to the determination that socket call 210 is directed to network interface 214.

The systems described herein may perform step 306 in a variety of ways and/or contexts. In some examples, tunneling module 108 may tunnel socket call 210 to operating system 218 installed on virtual machine 216 by way of a socket tunnel kernel module. In this example, the socket tunnel kernel module may include and/or represent the actual tunnel and/or channel through which socket call 210 travels to ultimately arrive at operating system 218.

In some examples, the configuration of socket calls issued in operating system 212 may differ in one way or another from the configuration of socket calls issued in operating system 218. As a result, socket calls issued by application 208 running on operating system 212 may fail to achieve the intended networking action upon execution unless the socket calls are translated from one configuration to another. For example, translation module 112 may translate at least a portion of socket call 210 from a configuration that is specific to operating system 212 into a configuration that is specific to operating system 218. For example, translation module 112 may identify a parameter of socket call 210 in the configuration specific to operating system 212. Translation module 112 may then translate the parameter of socket call 210 from the configuration specific to operating system 212 into an intermediate state.

In one example, translation module 112 may perform this translation based at least in part on a translation table that accounts for the configuration specific to operating system 212, the intermediate state, and the configuration specific to operating system 218. Translation module 112 may build the translation table at runtime to account for the configuration specific to operating system 212, the intermediate state, and the configuration specific to operating system 218. Upon completion of this translation, tunneling module 108 may forward the translated portion of socket call 210 to operating system 218 by way of the socket tunnel kernel module.

As a specific example, translation module 112 may identify "4" as a parameter of socket call 210 intercepted in operating system 212. In this example, the translation table may indicate that the "4" parameter on the side of operating system 212 corresponds to an intermediate value of "1". Accordingly, translation module 112 may translate and/or convert the "4" parameter to an intermediate value of "1". Tunneling module 108 may then forward socket call 210 with the parameter in the intermediate state to operating system 218. By forwarding socket call 210 in this way, operating system 218 may be able to translate the parameter of socket call 210 from the intermediate state into the configuration that corresponds to operating system 218.

Returning to FIG. 3, at step 308 one or more of the systems described herein may execute the socket call within the second operating system to initiate at least one networking action with respect to the network interface on behalf of the application. For example, communication module 110 may, as part of computing device 202, execute socket call 210 within operating system 218 to initiate at least one networking action with respect to network interface 214 on behalf of application 208. In this example, the networking action may correspond to and/or depend on the purpose for socket call 210. Examples of such a networking action include, without limitation, creating a socket, connecting a socket to an external computing device, binding a socket to an address, reading data via a socket, writing data to a socket, listening for a connection via a socket, accepting a connection via a socket, variations of one or more of the same, combinations of one or more of the same, and/or any other suitable networking action.

The systems described herein may perform step 308 in a variety of ways and/or contexts. In some examples, communication module 110 may execute and/or implement socket call 210 transparently within operating system 218. For example, communication module 110 may execute socket call 210 such that the execution appears to application 208 to have been performed locally by operating system 212. In this example, since socket call 210 has been tunneled to operating system 218 without the knowledge of application 208, application 208 may be unaware that socket call 210 is actually executed within operating system 218 instead of within operating system 212.

In some examples, communication module 110 may execute and/or implement socket call 210 upon completion of the translation of the portion of socket call 210. In one example, translation module 112 may complete the translation of the portion of socket call 210 from the configuration that is specific to operating system 212 into the configuration that is specific to operating system 218. For example, translation module 112 may identify a parameter of socket call 210 in the intermediate state, which was previously translated from the configuration specific to operating system 212. Translation module 112 may then translate the parameter of socket call 210 from the intermediate state to the configuration that is specific to operating system 218. Translation module 112 may perform this translation based at least in part on the translation table that accounts for the configuration specific to operating system 212, the intermediate state, and the configuration specific to operating system 218.

Upon completion of this translation, communication module 110 may execute and/or implement the translated version of socket call 210. By executing and/or implementing the translated version of socket call 210 in this way, communication module 110 may initiate the networking action with respect to network interface 214 on behalf of application 208.

As a specific example, translation module 112 may identify "1" as a parameter of socket call 210 in the intermediate state. In this example, the translation table may indicate that the "1" parameter in the intermediate state corresponds to a parameter of "7" on the side of operating system 218. Accordingly, translation module 112 may translate and/or convert the "1" parameter to a parameter of "7". Communication module 110 may then execute the translated version of socket call 210 to initiate the networking action intended by application 208.

In some examples, the systems and methods described herein may ensure that all subsequent socket calls issued by application 208 are tunneled to operating system 218 so that operating system 218 is able to execute those socket calls on behalf of application 208. For example, interception module 104 may intercept all socket calls issued by application 208 subsequent to the issuance of socket call 210. In this example, determination module 106 may determine that such socket calls are directed to at least one network interface that is accessible to operating system 218 but inaccessible to operating system 212 due at least in part to the socket calls originating from the same application that issued socket call 210. As a result, tunneling module 108 may tunnel those socket calls to operating system 218 so that communication module 110 is able to execute those socket calls within operating system 218 instead of executing the socket calls within operating system 212.

Figure 4:
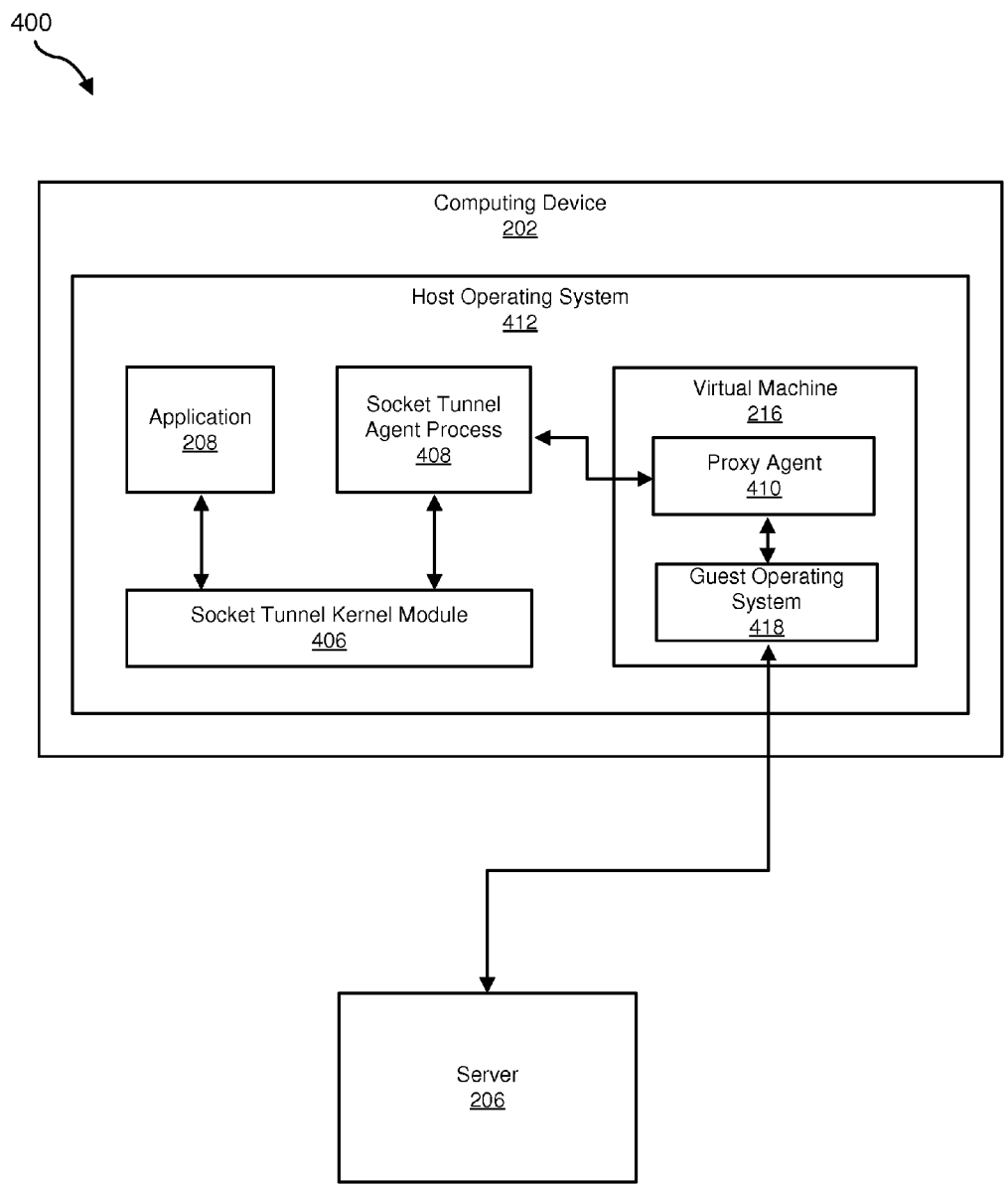
FIG. 4 is a block diagram of an additional exemplary system for tunneling socket calls across operating systems.

FIG. 4 is a block diagram of an exemplary system 400 for tunneling socket calls across operating systems. As illustrated in FIG. 4, system 400 may include computing device 202 and server 206. Computing device 202 may include and/or execute a host operating system 412. Additionally or alternatively, host operating system 412 may include and/or execute application 208.

In one example, application 208 may issue socket call 210 to initiate at least one networking action. In this example, the systems and methods described herein may intercept socket call 210 upon issuance by application 208. The systems and methods described herein may then determine that socket call 210 is directed to at least one network interface that is accessible to a guest operating system 418 but inaccessible to host operating system 412. As a result, the systems and methods described herein may forward socket call 210 to a socket tunnel kernel module 406 in FIG. 4.

In one example, socket tunnel kernel module 406 may carry socket call 210 to a socket tunnel agent process 408 in FIG. 4 that translates and/or converts at least one parameter of socket call 210 from a value that is specific to host operating system 412 into an intermediate value. After this translation and/or conversion, socket call 210 may travel to a proxy agent 410 in FIG. 4 included in virtual machine 216. As socket call 210 arrives, proxy agent 410 may translate and/or convert the parameter from the intermediate value to a value that is specific to guest operating system 418.

Upon completion of this translation and/or conversion, proxy agent 410 may forward socket call 210 to guest operating system 418 running on virtual machine 216. Guest operating system 418 may then execute and/or implement socket call 210 to initiate at least one networking action that implicates and/or affects communication between application 208 running on computing device 202 and server 206.

Figure 5:
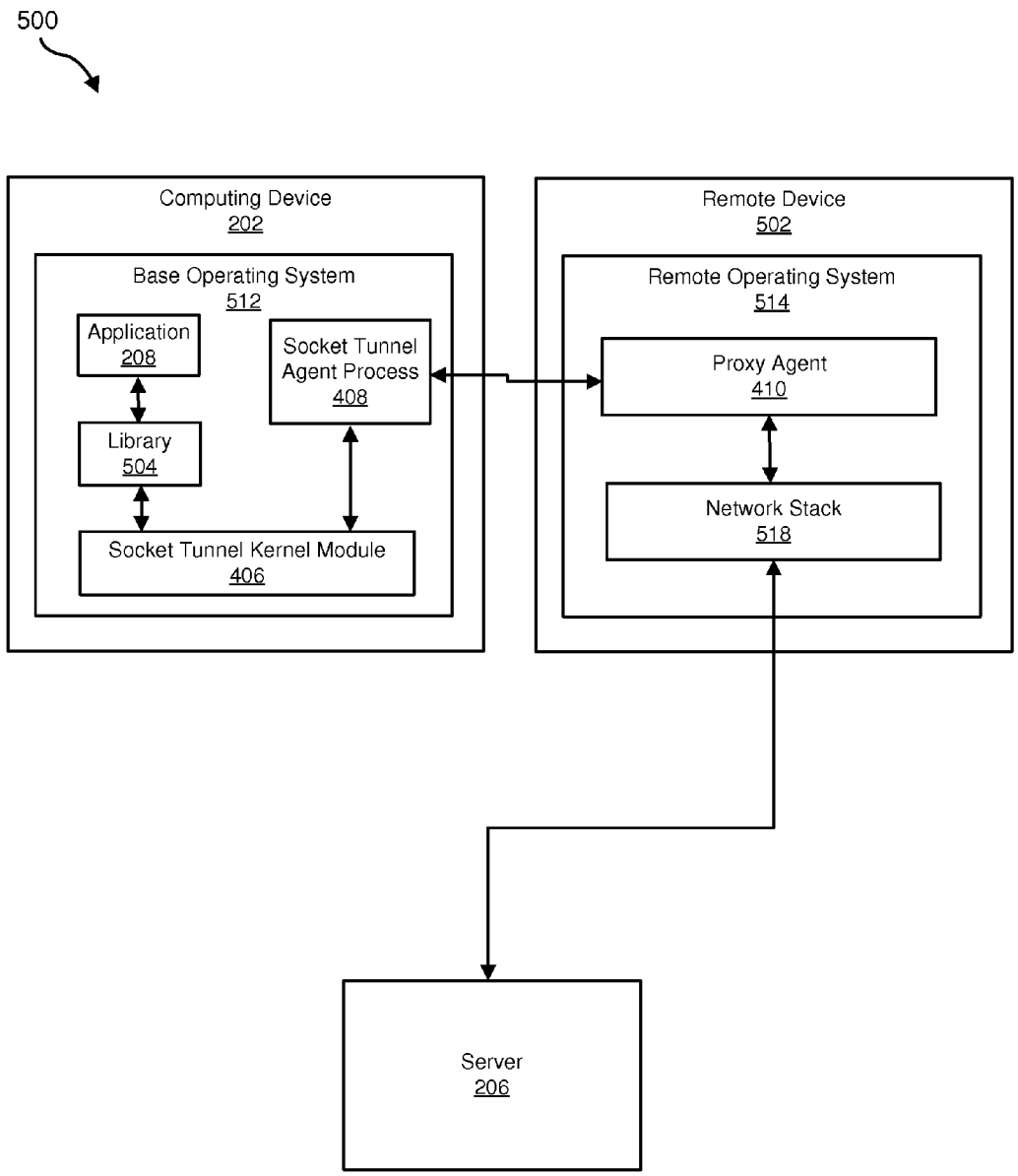
FIG. 5 is a block diagram of an additional exemplary system for tunneling socket calls across operating systems.

FIG. 5 is a block diagram of an exemplary system 500 for tunneling socket calls across operating systems. As illustrated in FIG. 5, system 500 may include computing device 202, server 206, and a remote device 502. Computing device 202 may include and/or execute a base operating system 512. Additionally or alternatively, base operating system 512 may include and/or execute application 208.

In one example, application 208 may issue socket call 210 to initiate at least one networking action. In this example, socket call 210 may invoke a function included in a library 504 in FIG. 5. As a specific example, library 504 may include and/or represent proprietary library "libjnprsock". As a result of socket call 210 invoking the function included in library 504, the systems and methods described herein may determine that socket call 210 is directed to at least one network interface that is accessible to a remote operating system 514 in FIG. 5 installed on remote device 502 but inaccessible to base operating system 512. In response to this determination, the systems and methods described herein may forward socket call 210 to socket tunnel kernel module 406.

In one example, socket tunnel kernel module 406 may carry socket call 210 to socket tunnel agent process 408 that translates and/or converts at least one parameter of socket call 210 from a value that is specific to operating system 212 into an intermediate value. After this translation and/or conversion, socket call 210 may travel to proxy agent 410 included remote operating system 514. As socket call 210 arrives, proxy agent 410 may translate and/or convert the parameter from the intermediate value to a value that is specific to remote operating system 514.

Upon completion of this translation and/or conversion, proxy agent 410 may forward socket call 210 to a network stack 518 in FIG. 5. Network stack 518 may then execute and/or implement socket call 210 to initiate at least one networking action that implicates and/or affects communication between application 208 running on computing device 202 and server 206.

Figure 6:
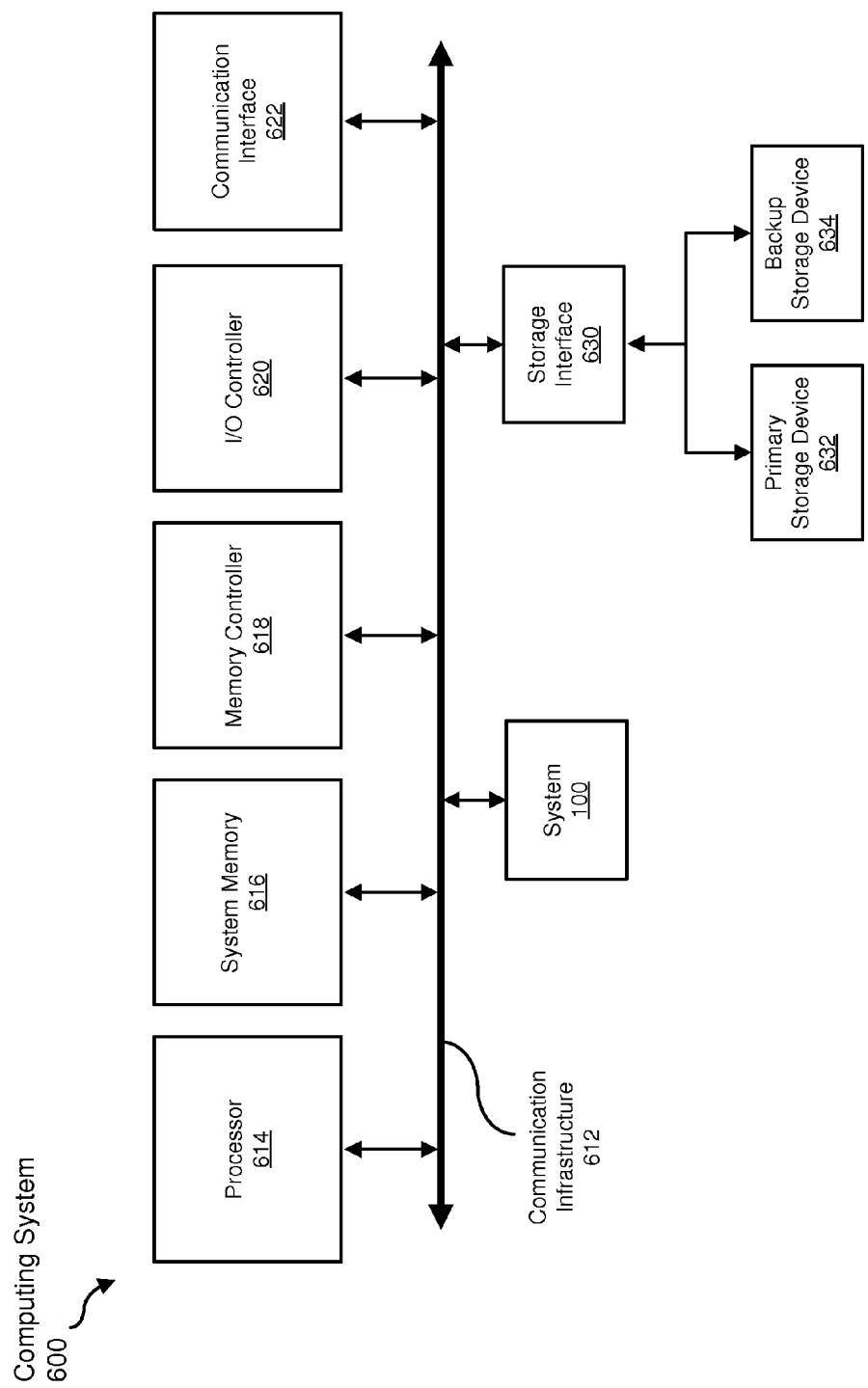
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein. In one example, computing system 600 may include system 100 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive a socket call to be transformed, transform the socket call, output a result of the transformation to make the socket call compatible across operating systems, use the result of the transformation to execute the socket call, and store the result of the transformation for future use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   intercepting a socket call issued by an application running on a first operating system of a physical computing device;
   determining that the socket call is directed to a network interface that is:
      accessible to a second operating system; and
      inaccessible to the first operating system of the physical computing device;
   in response to determining that the socket call is directed to the network interface, tunneling the socket call to the second operating system by:
      translating at least a portion of the socket call from a configuration specific to the first operating system into a configuration specific to the second operating system; and
      forwarding the translated portion of the socket call to the second operating system; and
   executing, within the second operating system, the socket call to initiate at least one networking action with respect to the network interface on behalf of the application.

2. The method of claim 1, wherein:
   translating the portion of the socket call from the configuration specific to the first operating system into the configuration specific to the second operating system comprises:
      identifying a parameter of the socket call in the configuration specific to the first operating system; and
      translating the parameter of the socket call from the configuration specific to the first operating system into an intermediate state; and
   forwarding the translated portion of the socket call to the second operating system comprises forwarding the parameter of the socket call in the intermediate state to the second operating system such that the second operating system is able to translate the parameter of the socket call from the intermediate state into a configuration that corresponds to the second operating system.

3. The method of claim 2, wherein translating the parameter of the socket call from the configuration specific to the first operating system into the intermediate state comprises translating the parameter of the socket call into the intermediate state based at least in part on a translation table that accounts for the configuration specific to the first operating system, the intermediate state, and the configuration specific to the second operating system.

4. The method of claim 3, further comprising building the translation table at runtime to account for the configuration specific to the first operating system, the intermediate state, and the configuration specific to the second operating system.

5. The method of claim 1, further comprising providing a set of Portable Operating System Interface (POSIX) Application Programming Interfaces (APIs) to the application by way of a socket tunnel kernel module that facilitates tunneling the socket call to the second operating system.

6. The method of claim 1, wherein determining that the socket call is directed to the network interface comprises:
determining that the socket call invokes a proprietary library whose functions are intended for execution within the second operating system; and
determining, based at least in part on the socket call invoking the proprietary library, that the socket call is directed to the network interface.

7. The method of claim 1, wherein determining that the socket call is directed to the network interface comprises:
determining that the socket call invokes a protocol that corresponds to the second operating system; and
determining, based at least in part on the socket call invoking the protocol, that the socket call is directed to the network interface.

8. The method of claim 1, wherein determining that the socket call is directed to the network interface comprises:
determining that the socket call identifies a socket type specific to the second operating system; and
determining, based at least in part on the socket call identifying the socket type specific to the second operating system, that the socket call is directed to the network interface.

9. The method of claim 1, wherein determining that the socket call is directed to the network interface comprises determining that the socket call represents a request to transmit at least one packet to an external computing device via the network interface.

10. The method of claim 1, wherein the second operating system comprises a remote network stack that is independent of a native network stack internal to the first operating system.

11. The method of claim 1, wherein the socket call comprises at least one of:
a socket system call;
a connect system call;
a read system call;
a write system call;
a bind system call;
a listen system call; and
an accept system call.

12. A system comprising:
an interception module, stored in memory, that intercepts a socket call issued by an application running on a first operating system of a physical computing device;
a determination module, stored in memory, that determines that the socket call is directed to a network interface that is:
accessible to a second operating system; and
inaccessible to the first operating system of the physical computing device;
a tunneling module, stored in memory, that tunnels the socket call to the second operating system in response to the determination that the socket call is directed to the network interface;
a translation module, stored in memory, that translates at least a portion of the socket call from a configuration specific to the first operating system into a configuration specific to the second operating system;
wherein the tunneling module forwards the translated portion of the socket call to the second operating system; and
a communication module, stored in memory, that executes, within the second operating system, the socket call to initiate at least one networking action with respect to the network interface on behalf of the application; and
at least one physical processor that executes the interception module, the determination module, the tunneling module, the translation module, and the communication module.

13. The system of claim 12, wherein:
the translation module translates the portion of the socket call from the configuration specific to the first operating system into the configuration specific to the second operating system by:
identifying a parameter of the socket call in the configuration specific to the first operating system; and
translating the parameter of the socket call from the configuration specific to the first operating system into an intermediate state; and
the tunneling module forwards the parameter of the socket call in the intermediate state to the second operating system such that the second operating system is able to translate the parameter of the socket call from the intermediate state into a configuration that corresponds to the second operating system.

14. The system of claim 13, wherein the translation module translates the parameter of the socket call into the intermediate state based at least in part on a translation table that accounts for the configuration specific to the first operating system, the intermediate state, and the configuration specific to the second operating system.

15. The system of claim 14, the translation module builds the translation table at runtime to account for the configuration specific to the first operating system, the intermediate state, and the configuration specific to the second operating system.

16. The system of claim 12, further comprising a providing module that provides a set of Portable Operating System Interface (POSIX) Application Programming Interfaces (APIs) to the application by way of a socket tunnel kernel module that facilitates tunneling the socket call to the second operating system; and
wherein the physical processor further executes the providing module.

17. The system of claim 12, wherein the determination module:
determines that the socket call invokes a proprietary library whose functions are intended for execution within the second operating system; and
determines, based at least in part on the socket call invoking the proprietary library, that the socket call is directed to the network interface.

18. A non-transitory computer-readable-storage medium comprising one or more computer-readable instructions that, when executed by at least one processor of a computing device, cause the computing device to:
intercept a socket call issued by an application running on a first operating system of a physical computing device;
determine that the socket call is directed to a network interface that is:
accessible to a second operating system; and
inaccessible to the first operating system of the physical computing device;
tunnel the socket call to the second operating system in response to determining that the socket call is directed to the network interface by:

translating at least a portion of the socket call from a configuration specific to the first operating system into a configuration specific to the second operating system; and forwarding the translated portion of the socket call to the second operating system; and execute, within the second operating system, the socket call to initiate at least one networking action with respect to the network interface on behalf of the application.

* * * * *